US012724644B1

(12) United States Patent
Loughmiller

(10) Patent No.: US 12,724,644 B1
(45) **Date of Patent: *Sep. 1, 2026**

(54) VIRTUAL MACHINE RESOURCE DISPLAY

(71) Applicant: Scale Computing, Inc., Austin, TX (US)

(72) Inventor: Scott Loughmiller, San Francisco, CA (US)

(73) Assignee: Scale Computing, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/006,825

(22) Filed: Jun. 12, 2018

Related U.S. Application Data

(63) Continuation of application No. 13/841,059, filed on Mar. 15, 2013, now Pat. No. 10,019,287.

(60) Provisional application No. 61/692,660, filed on Aug. 23, 2012.

(51) Int. Cl.
*G06F 9/50* (2006.01)
*G06F 9/451* (2018.01)
*G06F 9/455* (2018.01)

(52) U.S. Cl.
CPC ............ *G06F 9/5077* (2013.01); *G06F 9/452* (2018.02); *G06F 9/45558* (2013.01)

(58) Field of Classification Search
CPC .. G06F 12/084; G06F 12/0815; G06F 9/4881; G06F 11/106; G06F 12/1045; G06F 13/1663; G06F 2212/283; G06F 2212/6024; G06F 2212/621; G06F 9/5016; G06F 9/5038; G06F 9/5077; G06F 9/452; G06F 9/45558
See application file for complete search history.

(56) References Cited

U.S. PATENT DOCUMENTS

| | | | |
|---|---|---|---|
| 8,145,785 B1 * | 3/2012 | Finkelstein | H04L 49/357 370/401 |
| 8,175,863 B1 * | 5/2012 | Ostermeyer | G06F 17/5009 703/13 |
| 9,286,222 B2 * | 3/2016 | Greenhalgh | G06F 1/3203 |
| 9,336,030 B1 * | 5/2016 | Marr | G06F 9/45533 |
| 2002/0087811 A1 * | 7/2002 | Khare | G06F 12/0817 711/146 |

(Continued)

*Primary Examiner* — Dong U Kim

(74) *Attorney, Agent, or Firm* — Kowert, Hood, Munyon, Rankin & Goetzel, P.C.; Jeffrey C. Hood; Matthew C. Washburn

(57) ABSTRACT

Presenting information to operators of a cluster of physical devices, regarding resources being used by physical machines assigned to physical devices in those clusters. An operator console, coupled to the cluster of physical devices, receives information from those physical devices with respect to use of resources by virtual machines assigned to those physical devices. Each physical device reports virtual machines assigned thereto, and an physical memory assigned to each one. The operator console presents information to the operator regarding use of resources by virtual machines, in a natural and visible way. Physical devices are disposed horizontally to indicate a selected device, and vertically to indicate allocated resources. Virtual machines are disposed with each virtual machine occupying a vertical amount proportional to allocated resources. The graphical interface allows the operator to reallocate virtual machines to physical devices, or reallocate resources to virtual machines.

20 Claims, 1 Drawing Sheet

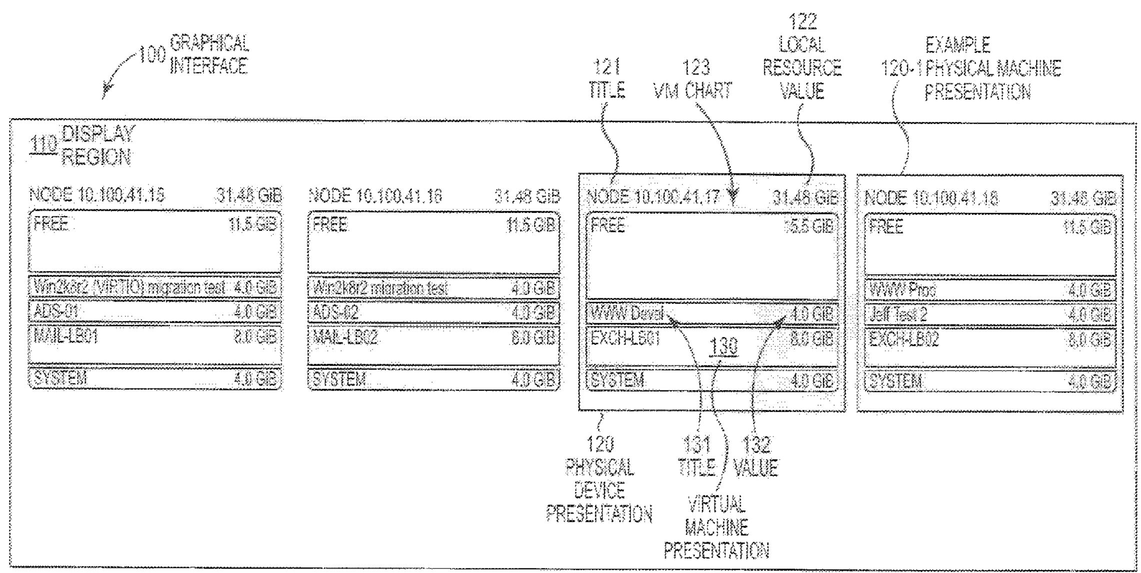

(56) References Cited

U.S. PATENT DOCUMENTS

2003/0009641 A1* 1/2003 Arimilli .............. G06F 12/0817 711/147
2005/0010728 A1* 1/2005 Piry .................... G06F 12/0831 711/147
2005/0080998 A1* 4/2005 Day .................... G06F 12/0835 711/141
2006/0026387 A1* 2/2006 Dinechin ............ G06F 9/45537 712/1
2006/0277206 A1* 12/2006 Bailey ................... G06F 11/328
2007/0294693 A1* 12/2007 Barham ................ G06F 9/4881 718/102
2008/0196043 A1* 8/2008 Feinleib .............. G06F 11/0712 719/319
2008/0201414 A1* 8/2008 Amir Husain .......... G06F 9/445 709/203
2008/0235477 A1* 9/2008 Rawson .............. G06F 12/0284 711/165
2008/0250213 A1* 10/2008 Holt ........................ G06F 9/526 711/159
2008/0270653 A1* 10/2008 Balle ..................... G06F 9/5077 710/109
2008/0307168 A1* 12/2008 Lilly ................... G06F 12/0831 711/146
2009/0198955 A1* 8/2009 Arimilli .............. G06F 12/0811 711/213
2009/0234987 A1* 9/2009 Lee ...................... G06F 9/5038 710/39
2009/0265293 A1* 10/2009 Nicholas ............. G06F 12/0862 706/45
2009/0276771 A1* 11/2009 Nickolov .............. G06F 9/4856 717/177
2009/0276783 A1* 11/2009 Johnson ................ G06F 9/5077 718/104
2009/0288084 A1* 11/2009 Astete ................. G06F 9/45533 718/1
2009/0300173 A1* 12/2009 Bakman ................ G06F 11/008 709/224
2010/0088699 A1* 4/2010 Sasaki ....................... G06F 8/63 718/1
2010/0115049 A1* 5/2010 Matsunaga ........... G06F 3/0626 709/216
2010/0138608 A1* 6/2010 Rappoport .......... G06F 12/0806 711/123
2010/0235580 A1* 9/2010 Bouvier ................ G06F 12/084 711/129
2010/0318931 A1* 12/2010 Boykin ................. G06F 3/0482 715/771
2011/0161851 A1* 6/2011 Barber .................. G06F 9/4856 715/769
2011/0161858 A1* 6/2011 Barber ................ G06F 11/3433 715/772
2012/0072910 A1* 3/2012 Martin ................ G06F 9/45533 718/1
2012/0102423 A1* 4/2012 Hollingsworth ...... G06F 11/328 715/772
2012/0124297 A1* 5/2012 Chung ................ G06F 12/0817 711/141
2012/0254445 A1* 10/2012 Kawamoto ........... G06F 9/5077 709/226
2012/0311475 A1* 12/2012 Wong .................. G06F 11/3003 715/772
2013/0024645 A1* 1/2013 Cheriton ................. G06F 12/10 711/206
2013/0055092 A1* 2/2013 Cannon, III .......... G06F 3/0484 715/738
2013/0117676 A1* 5/2013 De Pauw .................. G06F 3/00 715/738
2013/0179666 A1* 7/2013 Yamashita ............ G06F 9/3834 712/228
2013/0275975 A1* 10/2013 Masuda ................ G06F 9/5077 718/1
2014/0019966 A1* 1/2014 Neuse ................ G06F 9/45533 718/1
2014/0082624 A1* 3/2014 Iwabuchi .............. G06F 9/4881 718/102
2014/0115272 A1* 4/2014 Pierson ............... H04L 63/0263 711/146
2014/0201761 A1* 7/2014 Dalal ...................... G06F 13/16 718/108
2014/0223428 A1* 8/2014 Hackett ................. G06F 9/5088 718/1
2014/0281234 A1* 9/2014 Power ................. G06F 12/0815 711/122
2014/0351519 A1* 11/2014 Munoz ................ G06F 12/0811 711/122
2015/0128053 A1* 5/2015 Bragstad ................. H04L 41/22 715/736
2015/0254104 A1* 9/2015 Kessler ................. G06F 9/4881 711/170
2016/0179679 A1* 6/2016 Morris ................ G06F 12/0862 711/137
2016/0179718 A1* 6/2016 Morris .................... G06F 13/28 710/308
2016/0179740 A1* 6/2016 Halleck ................... G06F 13/22 710/106
2016/0342195 A1* 11/2016 Karamcheti .......... G06F 1/3209
2017/0019350 A1* 1/2017 Fahim ................... H04L 49/254

* cited by examiner

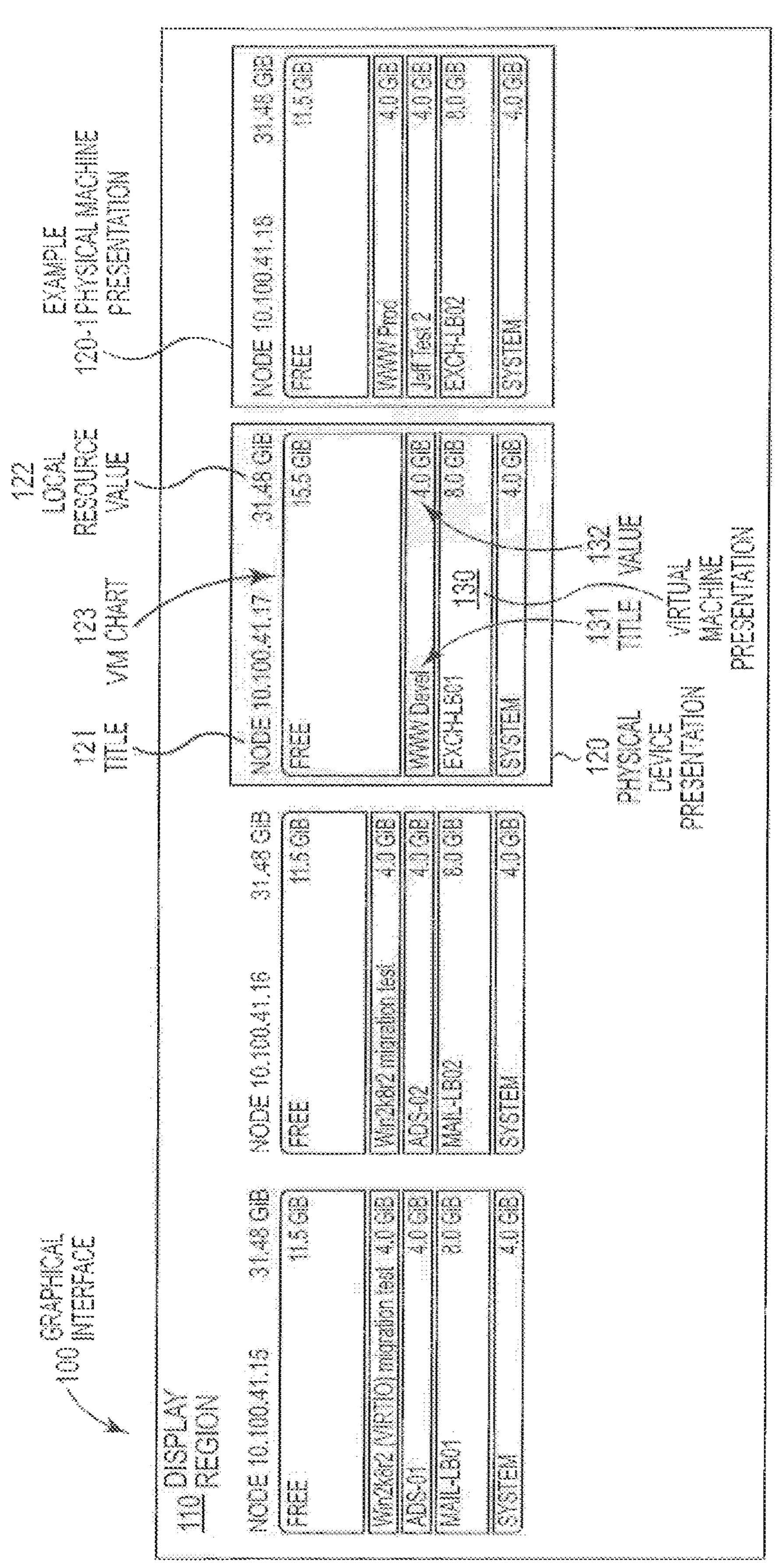

100 GRAPHICAL INTERFACE
110 DISPLAY REGION
NODE 10.100.41.15 31.48 GiB
FREE 11.5 GiB
Win2k8r2 (VIRTIO) migration test 4.0 GiB
ADS-01 4.0 GiB
MAIL-LB01 8.0 GiB
SYSTEM 4.0 GiB
NODE 10.100.41.16 31.48 GiB
FREE 11.5 GiB
Win2k8r2 migration test 4.0 GiB
ADS-02 4.0 GiB
MAIL-LB02 8.0 GiB
SYSTEM 4.0 GiB
121 TITLE
123 VM CHART
122 LOCAL RESOURCE VALUE
NODE 10.100.41.17 31.48 GiB
FREE 15.5 GiB
WWW Devel 4.0 GiB
EXCH-LB01 8.0 GiB
130
SYSTEM 4.0 GiB
120 PHYSICAL DEVICE PRESENTATION
131 TITLE
132 VALUE
VIRTUAL MACHINE PRESENTATION
120-1 EXAMPLE PHYSICAL MACHINE PRESENTATION
NODE 10.100.41.18 31.48 GiB
FREE 11.5 GiB
WWW Prod 4.0 GiB
Jeff Test 2 4.0 GiB
EXCH-LB02 8.0 GiB
SYSTEM 4.0 GiB

VIRTUAL MACHINE RESOURCE DISPLAY

CROSS-REFERENCE TO RELATED APPLICATIONS

Inventions described in this application can also be used in combination or conjunction, or otherwise, with techniques described in one or more of the following documents.

U.S. Provisional Patent Application 61/651,391, filed May 24, 2012, titled "Unified hypervisor and distributed fault-tolerant storage";

U.S. Provisional Patent Application 61/692,662, filed Aug. 23, 2012, titled "Transferring virtual machines and resource localization in a distributed fault-tolerant system"; and U.S. Provisional Patent Application 61/692,666, filed Aug. 23, 2012, titled "Virtual machine automated selection".

Each and every one of these documents is hereby incorporated by reference as if fully set forth herein. These documents are sometimes referred to herein as the "Incorporated Disclosures".

BACKGROUND

FIELD OF THE DISCLOSURE. This application generally relates to virtual machine resource display, and related matters.

BACKGROUND OF THE DISCLOSURE. Many enterprises centralize their information technology operations in data centers, which perform computing operations and maintain storage on behalf of the enterprise's personnel. In those data centers, application servers often perform computing operations, each of which is often executed within its own virtual machine (VM). Each virtual machine can include an emulation of a physical machine, which can be executed by a physical computing device. Storage requirements are often provided by storage servers, which maintain blocks of storage that can be accessed by application servers and other devices using a network storage proto-col.

It sometimes occurs that it is desirable to execute more than one virtual machine on a physical computing device. For example, in a data center as described above, a physical computing device can provide a service, which remote users can call upon, in which that physical computing device executes one or more virtual machines as request-ed. In such cases, the physical computing device provides physical resources, and allocates them to a specific virtual machine. When allocating the physical resources of the physical device to the virtual machines, it sometimes occurs that the physical resources available to that physical device limit the number and size of the virtual machines that the physical device can execute. For example, it sometimes occurs that a physical device having 32 GiB of memory cannot execute more than four virtual machines, each requiring 8 GiB of memory.

It sometimes occurs that multiple physical machines are disposed in a cluster, in which those multiple physical machines can intercommunicate. In such cases, one or more virtual machines, when allocated to physical devices, can have the effect of over-loading those physical devices with respect to other physical devices. This can have the effect of causing those overloaded physical devices to run more slowly than necessary, while more lightly loaded physical devices run more quickly and could take up some of that load. This can pose a problem when an operator is assigning virtual machines to physical devices, as that operator does not have a relatively convenient way of determining which ones of those physical devices are overloaded with respect to other physical devices in the cluster.

It sometimes occurs that when an operator reviews the use of resources by physical devices in the cluster, it would be convenient for that operator to have a relatively easy way to view the resources used by virtual machines. Similarly, when an opera tor reviews the use of resources by physical devices in the cluster, it would be convenient for that operator to have a relatively easy way to view which physical devices are loaded or overloaded in that cluster. Similarly, this can pose a problem when an operator is reviewing the assignment of virtual machine physical devices, at that operator does not have a relatively convenient way of determining which physical devices are overloaded with respect to other physical devices in the cluster.

Each of these examples, as well as other possible considerations, can cause difficulty in use multiple physical machines are disposed in a cluster. For example, the operator of a cluster should take care that virtual machines are not assigned so that one or more of the physical devices are overloaded. Moreover, the operator of a cluster should take care that use of resources by virtual machines assigned to physical devices are relatively well balanced with respect to each other. Each of these might have a detrimental effect on the value of the cluster of physical devices and on assignment of virtual machines to those physical devices.

BRIEF SUMMARY OF THE DISCLOSURE

This application provides techniques for presenting information to operators of a cluster of physical devices, with respect to resources being used by physical machines assigned to physical devices in those clusters.

In one embodiment, an operator console is coupled to the cluster of physical devices, and receives information from those physical devices with respect to use of resources by virtual machines assigned to those physical devices. For example, each physical device can report a set of virtual machines assigned thereto, and an amount of physical memory assigned to each of those virtual machines. The operator console presents information to the operator regarding use of resources by virtual machines, in a natural and visible way that allows the operator to assess, relatively rapidly, use of resources by virtual machines assigned to those physical devices.

In one embodiment, the physical devices are disposed in an array including at least a first dimension indicating a selected device, and with each device associated with at least a second dimension indicating an amount of allocated resources. For example, the first dimension can include a horizontal axis, in which each selected device is separately represented on that axis.

In one embodiment, the virtual machines are disposed in an array including at least the second dimension indicating each virtual machine, and with each virtual machine occupying an amount of that second dimension in response to its allocated resources. For example, the second dimension can include a vertical axis, in which each virtual machine is separately represented on the axis. In such cases, each virtual machine can include a height which is proportional to its allocated resources.

In combination, the representation of physical devices in virtual machines shows the operator, in a natural and visible way, which of the physical devices are relatively overloaded with respect to which others. For example, in combination, the representation can show which physical devices have a large number of virtual machines, or which physical devices have a total amount of allocated resources that exceed that of other physical devices.

The representation of physical devices in virtual machines also presents a graphical interface by which the operator can, in a natural and visible way, allocate or reallocate virtual machines to physical devices, and allocate or reallocate resources to virtual machines. For example, in combination, the representation can present a graphical interface by which the operator can move virtual machines between physical devices, or adjust the amount of resources allocated to virtual machines.

After reading this application, those skilled in the art would recognize that techniques shown in this application are applicable to fields and information other than those fields specifically described herein. In the context of the invention, there is no particular requirement for any such limitation.

Moreover, after reading this application, those skilled in the art would recognize that techniques shown in this application are applicable to methods and systems other than those involving portable operating environments. In the context of the invention, there is no particular requirement for any such limitation. For example, other con-texts can include frequent or important access to secured data, such as data that is otherwise hardware-protected, software-protected, or protected by use of a proprietary data format.

After reading this application, which shows and describes illustrative embodiments of the disclosure, other and further embodiments of the present disclosure will become apparent to those skilled in the art. As will be realized, the various embodiments of the present disclosure are capable of modifications in various obvious aspects, all without departing from the scope and spirit of the present disclosure. The drawings and detailed description are intended to be illustrative in nature and not restrictive in any way.

BRIEF DESCRIPTION OF THE FIGURES

FIG. 1 shows a conceptual drawing of a graphical interface.

DETAILED DESCRIPTION

Example Graphical Interface

FIG. 1 shows a conceptual drawing of a graphical interface.

In one embodiment, a graphical interface too can include a presentation of a display region no, one or more selected physical device presentations 120 (each having an associated physical device), each showing one or more virtual machine presentations 130 (each having an associated virtual machine).

PHYSICAL DEVICE PRESENTATIONS. In one embodiment, each physical device presentation 120 includes a separate presentation region, including a title 121, a local resource value 122, a virtual machine chart 123, and possibly other elements.

While this application primarily describes a system that assigns each physical device presentation 120 a separate presentation region, in the context of the invention, there is no particular requirement for any such limitation. For example, in some cases, more than one physical device presentation 120 can be combined into a collective presentation region. In a first such case, this might occur if there are a relatively large number of physical devices for which physical device presentations 120 are needed. In a second such case, this might occur if the physical devices had heterogeneous characteristics, and it is desirable to combine physical device presentations 120 for those physical devices having similar characteristics.

In one embodiment, the title 121 includes a character string naming the physical device associated with the physical device presentation 120, such as an IP ad-dress. However, in the context of the invention, there is no particular requirement for any such limitation. For example, the title 121 can include any other name for, or other character string associated with, the physical device associated with the physical device presentation 120. While the figure shows each physical device presentation 120 with a unique title 121, in the context of the invention, there is no particular requirement for any such limitation. For example, more than one physical device presentation 120 can have similar or identical names (in response to the possibility that more than one physical device can have similar or identical names).

In one embodiment, the local resource value 122 is responsive to a total amount of local resources. However, in the context of the invention, there is no particular requirement for any such limitation. For example, the local resource value 122 can include an amount of local resources currently in use, an amount of local resources remaining, or some other value.

In one embodiment, the local resource value 122 includes a value responsive to a single resource, such as an amount of memory, an amount of network bandwidth, an amount of processor usage, or otherwise. However, in the context of the invention, there is no particular requirement for any such limitation.

For a first example, the local resource value 122 can include a fraction of that resource that is free, or that is in use.

For a second example, the local resource value 122 can include a maximum or minimum, or other statistical value, with respect to allocation or usage of a particular resource.

For a third example, the local resource value 122 can include a value responsive to a formula with respect to allocation or usage of more than one resource. In one such case, a formula can be a static formula set by a designer, an operator, or a user. In another such case, a formula can be a dynamic formula responsive to usage, responsive to machine learning, or otherwise.

In one embodiment, the virtual machine chart 123 includes a region such as a rectilinear shape, which shows assignments of virtual machines to physical devices. In alternative embodiments, the virtual machine chart 123 can have a different shape, such as a pie chart, and need not have the same shape (or size) for each physical device presentation 120. For example, in one alternative embodiment, each physical device presentation 120 can include a virtual machine chart 123 size is responsive to an amount of allocable resources available to the physical device associated with that physical device presentation 120. In one such case, two physical device presentations 120 with differing allocable resources would be presented with virtual machine chart 123 with differing sizes.

In one embodiment, the virtual machine chart 123 includes one or more virtual machine presentations 130, each one showing information about an associated virtual machine. For example, the virtual machine chart 123 for an example physical device presentation 120-1 can include a virtual machine presentation 130 for a first virtual machine titled “SYSTEM”, a second virtual machine titled “EXCH-LB02”, a third virtual machine titled “Jeff Test 2”, a fourth virtual machine titled "WWW Prod", and a reserved space for unallocated resources (titled "FREE").

In one embodiment, the virtual machine presentations 130 can include, in addition to text, other information indicating the nature of the associated virtual machine, or of the resource use associated with that virtual machine. For example, the virtual machine presentations 130 can include color, highlighting, texture, or other aspects capable of being sensed by one or more operators (such as blinking, boldface text, italic text, or otherwise).

In one such case, a virtual machine presentation 130 for a virtual machine designated to operate the physical device (such as titled "SYSTEM") can include striping or another indicator to show that its associated virtual machine cannot readily be re-moved or reduced in size.

In another such case, a virtual machine presentation 130 for the reserved space for unallocated resources (such as titled "FREE") can include a blank color or another indicator to show that there is no such associated virtual machine and that the associated resources are so far unallocated.

In one embodiment, the virtual machine presentations 130 can be separated by a line or other indicator, to make reading the virtual machine chart 123 more convenient, to make selection of one or more virtual machine presentations 130 more readily convenient, or otherwise.

VIRTUAL MACHINE PRESENTATIONS. In one embodiment, each virtual machine presentation 130 includes a title 131 and a virtual machine resource value 132, and possibly other elements.

Similar to the title 121 associated with the physical device presentation 120, the title 131 includes a character string naming the virtual machine associated with the virtual machine presentation 130. As described above, some character strings can be reserved as a special indicators, such as the terms "SYSTEM" and "FREE".

Similar to the local resource value 122 associated with the physical device presentation 120, the virtual machine resource value 132 includes a value responsive to a single resource, such as an amount of memory, an amount of network bandwidth, an amount of processor usage, or otherwise. For example, the virtual machine resource value 132 can include a value similar to any of the values described above with respect to the local resource value 122.

INTERACTION WITH INTERFACE. In one embodiment, the operator can interact with the graphical interface 100, such as by selecting one or more physical device presentations 120, one or more virtual machine presentations 130, or otherwise. For example, the operator can select one or more physical device presentations 120 to indicate selection of associated physical devices, can select one or more virtual machine presentations 130 can indicate selection of associated virtual machines (or free space), or can select some other element.

In one embodiment, the operator can direct the cluster to add or remove one or more physical devices. In response thereto, the graphical interface 100 adds or removes associated physical device presentations 120. For a first example, the operator can select one or more physical device presentations 120, and direct the graphical interface 100 to remove the associated physical devices. For a second example, the operator can select one or more physical device presentations 120, and direct the cluster to resize the associated physical devices, such as by adjusting a size of those physical device presentations 120. Thereafter, the cluster would treat those associated physical devices as having new sizes, as specified by the operator.

In one embodiment, the operator can direct the cluster to add or remove one or more virtual machines to selected physical devices. In response thereto, the graphical interface 100 adds or removes associated virtual machine presentations 130. For a first example, the operator can select one or more virtual machine presentations 130, and direct the graphical interface 100 to remove the associated virtual machines from their physical devices. For a second example, the operator can select one or more virtual machine presentations 130, and direct the graphical interface 100 to resize the associated virtual machines, such as by adjusting a border between two virtual machine presentations 130, or between a virtual machine presentation 130 and free space. Thereafter, the cluster would treat those associated virtual machines as having new sizes, as specified by the operator, and would adjust an amount of free space available on their physical device-es (and adjust their physical device presentations 120).

In one embodiment, the operator can direct the cluster to move or copy one or more virtual machines between selected physical devices. In response thereto, the graphical interface too moves associated virtual machine presentations 130 between selected physical device presentations 120. For a first example, the operator can select one or more virtual machine presentations 130, and drag those virtual machine presentations 130 between selected physical device presentations 120. Thereafter, the cluster would remove those associated virtual machines from the source physical devices, restart them on the destination physical devices, as specified by the operator, and would adjust an amount of free space available on the source and destination physical devices (and adjust their physical device presentations 120).

In one embodiment, the operator can direct the cluster to rebalance load between selected physical devices, such as with respect to selected virtual machines. In response thereto, the graphical interface 100 computes a rebalanced loading of those physical devices with those virtual machines. Having done so, the cluster removes those associated virtual machines from the computed source physical devices, restarts them on the computed destination physical devices, as determined by the rebalanced loading, and would adjust the amount of free space available on the source and destination physical devices (and adjust their physical device presentations 120).

In one embodiment, the operator can direct the cluster to perform one or more such operations multiple times, such as by selecting multiple physical device presentations 120 or multiple virtual machine presentations 130.

For a first example, the operator can concurrently adjust the size of multiple physical devices. Similarly, the operator can concurrently remove multiple physical devices, or add multiple copies of a new physical device.

For a second example, the operator can concurrently adjust the size of multiple virtual machines. Similarly, the operator can concurrently remove multiple virtual machines, or add multiple copies of a new virtual machine.

For a third example, the operator can concurrently move multiple virtual machines between physical devices.

For a fourth example, the operator can concurrently copy virtual machines from one or more source physical devices to multiple destination physical places. This can have the effect of selecting one or more virtual machines, and making multiple copies thereof at selected destination physical devices.

After reading this application, the those skilled in the art will recognize that many other such examples are possible, are within the scope and spirit of the invention, and would be workable, without any requirement for new invention or further experiment.

ALTERNATIVE EMBODIMENTS

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure as defined in the claims that follow.

The invention claimed is:

1. A method, including steps of:

executing one or more virtual machines within physical resources provided by a plurality of physical devices disposed in an intercommunicating cluster of said physical devices, the intercommunicating cluster of said physical devices sharing at least one physical resource;

providing a user interface for allocation of the one or more virtual machines to selected ones of those physical devices, the user interface including a graphical interface indicating at least:

a first dimension associated with selected ones of the physical devices available in the cluster of physical devices, and at least a second dimension associated with the physical resources available at each physical device, wherein the second dimension is proportional, for each virtual machine currently allocated to a selected physical device, to an amount of physical resources currently allocated to that virtual machine, wherein at least two virtual machines have different amounts of physical resources allocated to each virtual machine; and re-allocating an amount of the physical resources available at one of the physical devices among selected virtual machines in response to interaction with the user interface, wherein the interaction comprises adjusting a graphical interface border between virtual machines along the second dimension, thereby reallocating physical resources corresponding to a virtual machine.

2. A method as in claim 1, wherein the step of allocating improves performance of the virtual machines.

3. A method as in claim 1, wherein the step of allocating improves performance of the physical resources.

4. A method as in claim 1, wherein the step of allocating includes steps of reallocating the virtual machines to other physical resources.

5. A method as in claim 1, wherein the virtual machines form a cluster of virtual machines.

6. A method as in claim 1, including steps of the user interface providing an indication that one or more of the physical resources are overloaded by one or more of the virtual machines.

7. A method as in claim 6, including steps of reallocating one or more of the virtual machines to one or more of the physical resources upon the indication that one or more of the physical resources are overloaded.

8. A system, including:

a plurality of intercommunicating physical devices disposed in a cluster and disposed to execute one or more virtual machines within physical resources provided by the physical devices, the intercommunicating cluster of said physical devices sharing at least one physical resource;

a user interface disposed to present information about the physical resources allocated to the one or more virtual machines at each of the physical devices, and disposed to receive commands for allocation of the physical resources to selected ones of those virtual machines, the user interface including a graphical interface indicating:

at least a first dimension associated with selected ones of the physical devices available in the cluster of physical devices, and at least a second dimension associated with the physical resources available at each physical device, wherein the second dimension is proportional, for each virtual machine currently allocated to a selected physical device, to an amount of physical resources currently allocated to that virtual machine, wherein at least two virtual machines have different amounts of physical resources allocated to each virtual machine; and wherein the system re-allocates an amount of the physical resources available at one of the physical devices among selected virtual machines in response to interaction with the user interface, wherein the interaction comprises adjusting a graphical interface border between virtual machines along the second dimension, thereby reallocating physical resources corresponding to a virtual machine.

9. A system as in claim 8, wherein the system improves performance of the virtual machines, the physical resources, or both, using allocation of the virtual machines.

10. A system as in claim 8, wherein the virtual machines are reallocated to other physical resources.

11. A system as in claim 8, wherein the virtual machines form a cluster.

12. A system as in claim 8, wherein the user interface provides an indication that one or more of the physical resources are overloaded by one or more of the virtual machines.

13. A system as in claim 12, wherein the system reallocates one or more of the virtual machines to one or more of the physical resources upon the indication that one or more of the physical resources are overloaded.

14. A method, including steps of executing one or more virtual machines within physical resources provided by a plurality of intercommunicating physical devices disposed in a cluster of said physical devices, the intercommunicating cluster of said physical devices sharing at least one physical resource;

presenting a graphical user interface showing allocated and unallocated resources within the physical resources in at least two dimensions, wherein a first one of the two dimensions represents one or more selected ones of those physical devices, and wherein a second one of the two dimensions is proportional, for each virtual machine currently allocated to a selected physical device, to an amount of physical resources currently allocated to that virtual machine, wherein at least two virtual machines have different amounts of physical resources allocated to each virtual machine; and re-allocating an amount of the physical resources available at one of the physical devices among selected virtual machines in response to the graphical user interface, wherein the interaction comprises adjusting a graphical interface border between virtual machines along the second dimension, thereby reallocating physical resources corresponding to a virtual machine.

15. A method as in claim 14, wherein the step of allocating improves performance of the virtual machines.

16. A method as in claim 14, wherein the step of allocating improves performance of the physical resources.

17. A method as in claim 14, wherein the step of allocating includes steps of reallocating the virtual machines to other physical resources.

18. A method as in claim 14, wherein the virtual machines comprise a cluster of virtual machines.

19. A method as in claim 14, further comprising the user interface providing an indication that one or more of the physical resources are overloaded by one or more of the virtual machines.

20. A method as in claim 19, further comprising reallocating one or more of the virtual machines to one or more of the physical resources upon the indication that one or more of the physical resources are overloaded.

* * * * *